United States Patent [19]

Beck

[11] Patent Number: 4,670,530

[45] Date of Patent: Jun. 2, 1987

[54] PROCESS FOR MAKING CRUMB SILICONE MATERIAL

[75] Inventor: Earl W. Beck, Dublin, Calif.

[73] Assignee: Dow Corning Corporation, Midland, Mich.

[21] Appl. No.: 835,497

[22] Filed: Mar. 3, 1986

[51] Int. Cl.$^4$ ............................................... C08G 77/06
[52] U.S. Cl. ..................................... 528/15; 528/31;
528/32; 524/781; 524/789; 525/478; 264/176.1;
264/331.11
[58] Field of Search ...................... 264/176 R, 331.11;
528/15, 31, 32; 525/478; 524/781, 789

[56] References Cited

U.S. PATENT DOCUMENTS 3,843,601 10/1974 Bruner ................................. 528/24
4,528,156 7/1985 Fukuda et al. ...................... 528/15

OTHER PUBLICATIONS

"Materials News from Dow Corning"/ Nov.-Dec. 1969, New Shock-Absorbing Bumper Turns 30-mph Crash into 5-mph Bump.—p. 3.

Primary Examiner—Melvyn I. Marquis
Attorney, Agent, or Firm—Roger H. Borrousch

[57] ABSTRACT

Mixing under low shear vinyl-containing polyorganosiloxane, a silicon-bonded hydrogen polysiloxane and a platinum catalyst, and continue mixing produces a crumb which has an extrusion rate of at least 50 grams per minute through an orifice of 0.5 inch diameter under a pressure of 345 kilopascals and compression points of less than 1035 kilopascals. The crumb is useful in hydraulic applications.

31 Claims, No Drawings

PROCESS FOR MAKING CRUMB SILICONE MATERIAL

BACKGROUND OF THE INVENTION

1. Field of the Invention

This invention relates to a process for making a crumb silicone material.

2. Background Information

Making silicone materials into crumbs or powder is known in the art. The most difficult solid silicone materials to make into powders or crumb are the deformable, flexible material such as the elastomeric materials. Hard and brittle materials can be ground but the flexible materials do not lend themselves to being ground by ordinary techniques. Elastomeric materials can be divided or made into particulate material by sheeting and cutting into small pieces or by shearing under very high shear. Another technique which has been used is to reduce the temperature below its glass transition temperature and then grinding or dividing it some other way. These techniques are suitable to make the materials into particles but are expensive and difficult to do. For example, with the glass transition temperature for some silicone materials at $-120°$ C., cryogenic methods are required. Bruner in U.S. Pat. No. 3,843,601, issued Oct. 22, 1974, teaches that a silicone elastomer made by curing a vinyl containing polymethylsiloxane with a vinyl specific peroxide can be crumbled into a powder under high shear stress conditions. These high shear stress conditions require special shearing apparatus to generate the proper shearing action and as a result are expensive or limited in the kinds of materials which can be used to make the powder.

SUMMARY OF THE INVENTION

An object of the present invention is to provide a method for making silicone crumb which can be done quickly, inexpensive, and with a minimum of equipment to produce a silicone crumb which flows more easily and can be used as a hydraulic medium.

This invention relates to a method of making a silicone crumb comprising mixing under low shear the following ingredients which cure to a material with a low internal shear strength and a low durometer, (A) a vinyl-containing polyorganosiloxane consisting essentially of units selected from the group consisting of diorganosiloxane units, monoorganosilsesquioxane units, and triorganosiloxy units in which the organic radicals are monovalent hydrocarbon radicals or monovalent halogenated hydrocarbon radicals, in the polyorganosiloxane the organic radicals being such that at least 0.1 weight percent of them are vinyl radicals, (B) a silicon-bonded hydrogen containing polysiloxane in which there is at least 0.5 weight percent silicon-bonded hydrogen atoms, the valences of the silicon atoms not being satisfied by divalent oxygen atoms or silicon-bonded hydrogen atoms are satisfied by monovalent hydrocarbon radicals or monovalent halogenated hydrocarbon radicals, (C) a platinum catalyst for the hydrosilation reaction of (A) and (B), the mixing being continued until a crumb which is in a fine particulate form which exhibits an extrusion rate of at least 50 grams per minute through an orifice of 0.5 inch diameter under a pressure of 345 kilopascals and compression points of less than 1035 kilopascals for the first two compressions, said mixing being sufficient to thoroughly mix the ingredients before significant cure takes place and crumb is formed.

DESCRIPTION OF THE PREFERRED EMBODIMENTS

The method of the present invention comprises mixing under low shear a vinyl-containing polyorganosiloxane, a silicon-bonded hydrogen containing polysiloxane, and a platinum catalyst until a crumb is obtained in fine particulate form. The mixing procedure can be quickly done with ordinary equipment to provide the low shear. For example, the mixing can be done easily by hand by stirring it with a spatula, by an air powered propeller mixer, or by more sophisticated commercial equipment such as a Baker Perkins, Ross, or Meyers mixer. The ingredients are placed in a container and then simply mixed until the crumb is obtained. The ingredients used in this method are important to the process because if the ingredients produce a cured material which will not crumb under low shear, produce a crumb which has unacceptable properties in hydraulic applications, or can not be mixed with the equipment being used, this method will not function. Therefore, the steps and the ingredients are both part of the method of this invention.

The vinyl-containing polyorganosiloxane, the silicon-bonded hydrogen containing polysiloxane, and the platinum catalyst begin to cure at room temperature when they are mixed, thus as the mixing continues the curing reaction is taking place. However, this room temperature reaction can be too fast and cure can occur before the ingredients are thoroughly mixed resulting in small domains throughout the material of highly crosslinked particles or regions and low or uncrosslinked regions, and for this reason, the presence of a platinum catalyst inhibitor which retards the reaction at room temperature between the vinyl-containing polyorganosiloxane and the silicon-bonded hydrogen containing polysiloxane is desirable. Those mixtures which contain platinum catalyst inhibitors can be heated to temperatures such as above $50°-70°$ C. to overcome the inhibiting effect which allows the curing reaction to proceed. For this method to produce a crumb which is useful to transmit pressure evenly throughout, a homogeneous cure or crosslink density is desirable. A homogeneous cure can not be obtained if the crosslinking reaction is too rapid and cured domains begin to appear before the ingredients are thoroughly mixed, thus it is important that the crosslinking be slow enough at room temperature or the mixing temperature to allow the ingredients to be thoroughly mixed before significant cure takes place.

The ingredients when being mixed can be heated to shorten the cure reaction time and the crumbing time. Heating is especially required when the ingredients contain a platinum catalyst inhibitor. The heat can be applied by any suitable heating means to the outside of the container for the ingredients being mixed. Heating means are well known in the art. The temperature when the platinum catalyst inhibitor is used is desirably above $50°$ C. and can be up to $200°$ C. or more. The higher temperatures should be used for short periods of time because the composition may result in undesirable side reactions if the heating is continued too long. The heating, mixing, and crumbing time can be as short as a few minutes and is preferably less than one hour.

The heating process for the ingredients during the mixing can be used to remove undesirable volatile materials which can increase the weight loss of the crumb during heating when in use. To remove the undesirable volatile materials the ingredients can be placed in a closed chamber and the pressure inside the chamber can be reduced to remove the unreacted and unreactable materials which can increase the weight loss of the crumb under high temperature conditions.

After the crumb is formed, it can be put through a particle sizer, for example a screen to make the crumb particles more uniform in size and thus flow better. Such particle distribution of sizes may also be important to conversion of the crumb to the clear liquid appearing state. The sizer can be any of those known in the art such as screens of various meshes.

The silicone crumb made by the method of this invention is made by thoroughly mixing and curing a vinyl-containing polyorganosiloxane, a silicon-bonded hydrogen-containing polysiloxane, and a platinum catalyst.

The vinyl-containing polyorganosiloxane of (A) are those which are made up of repeating units of diorganosiloxane units, monoorganosilsesquioxane units, and triorganosiloxy units. Other siloxane units can also be present in small amounts if the resulting properties can be obtained, for example, $SiO_2$ units. The organic radicals of the polyorganosiloxane can be monovalent hydrocarbon radicals such as methyl, ethyl, propyl, isopropyl, butyl, octyl, phenyl, vinyl, allyl, and cyclohexyl, or monovalent halogenated hydrocarbon radicals such as chloropropyl, 3,3,3-trifluoro-propyl, and 2-(perfluorobutyl)ethyl. Preferably, the organic radicals are methyl and vinyl. The polyorganosiloxane of (A) should contain at least 0.1 weight percent vinyl radical based on the total weight of the polyorganosiloxane. The most preferred polyorganosiloxanes of (A) because they provide the best property profile of extrusion rate (flow) and compression points (point at which the crumb changes into a clear solid) are branched polyorganosiloxanes containing a combination of diorganosiloxane units, monoorganosilsesquioxane units, and triorganosiloxy units. Preferably, these branched vinyl-containing polyorganosiloxanes are those described be Brown et al. in U.S. Pat. No. 4,374,967, issued Feb. 22, 1983, which is hereby incorporated by reference to show the preparation of the vinyl-containing polymethylsiloxanes and the polymethylsiloxanes per se. These vinyl-containing polymethylsiloxanes described by Brown et al. consist essentially of 80 to 96.5 mole percent of dimethylsiloxane units, 2 to 10 mole percent of methylsilsesquioxane units, 1.25 to 6.0 mole percent of trimethylsiloxy units, and 0.25 to 4.0 mole percent of vinyldimethylsiloxy units. The branched polyorganosiloxane of (A) preferably have a viscosity at 25° C. of less than 5 pascal-seconds.

Another preferred vinyl-containing polyorganosiloxane is a linear triorganosiloxy endblocked polymethylvinylsiloxane having a viscosity at 25° C. of less than 50 pascal-seconds. The most preferred are those which have trimethylsiloxy endblocking.

The silicon-bonded hydrogen-containing polysiloxane of (B) contains at least 0.5 weight percent hydrogen atom and the radicals bonded to the silicon atoms other than hydrogen atoms and divalent oxygen atoms are monovalent hydrocarbon radical or halogenated hydrocarbon radicals which are illustrated above for the polyorganosiloxane of (A). Preferably, the organic radicals are methyl. The preferred polysiloxanes of (B) are the trimethylsiloxy endblocked polymethylhydrogensiloxanes and those most preferred have 1.4 to 1.6 weight percent silicon-bonded hydrogen atoms.

The platinum catalyst (C) is a catalyst for the hydrosilation reaction between the vinyl radicals on the polyorganosiloxane of (A) and the SiH on the polysiloxane of (B). The platinum catalysts are well known in the art and can be selected from any of them, but the catalyst should be one which is compatible in the mixture of (A) and (B) for even distribution and even cure. The platinum catalysts include chloroplatinic acid and its hexahydrate as described in U.S. Pat. No. 2,823,218, issued Feb. 11, 1958 to Speier et al, and the reaction products of chloroplatinic acid with vinyl endblocked polysiloxane fluids such as sym-divinyltetramethyldisiloxane as described by Willing in U.S. Pat. No. 3,419,593, issued Dec. 31, 1968. The platinum catalysts described by Willing which are preferred are those which are complexes of a divinylsiloxane. Other platinum catalysts include the alkene complexes described by Ashby in U.S. Pat. No. 3,159,601, issued Dec. 1, 1964, and in U.S. Pat. No. 3,159,662, issued Dec. 1, 1964; the platinum acetylacetonate described by Baney in U.S. Pat. No. 3,723,497, issued Mar. 27, 1973; the platinum alcoholates described by Lamoreaux in U.S. Pat. No. 3,220,972, issued Nov. 30, 1965, and in many more patents which describe other types of platinum catalysts. The foregoing patents describing platinum catalysts are hereby incorporated by reference to show the various type of platinum catalysts. The preferred platinum catalysts are those described by Willing.

The ingredients may begin to cure immediately when (A), (B), and (C) are mixed. If this curing reaction is too rapid, the curing can begin to take place before the ingredients are fully mixed and the result is the uneven cure as described above. Therefore, certain compositions may desirably contain a platinum catalyst inhibitor which retards the hydrosilation reaction at room temperature. Many platinum catalyst inhibitors are known in the art and include, benzotriazole as described in U.S. Pat. No. 3,192,181, issued June 29, 1965; the acetylenic compounds described in U.S. Pat. No. 3,445,420, issued May 20, 1969; the aromatic heterocyclic nitrogen compounds, pyridazine, pyrazine, quinoline, 2,2'-biquinoline, bipyridine, naphthyridine, quinaldine, dialkyl formamides, thioamides, alkylthioureas, and ethylene thiourea described in U.S. Pat. No. 3,188,299, issued June 8, 1965; the polymethylvinylsiloxane cyclics discussed in U.S. Pat. No. 3,923,705, issued Dec. 2, 1975; and many others. The preferred platinum catalyst inhibitors are the acetylenic compounds. The above patents related to platinum catalyst inhibitors are hereby incorporated by reference to show the various platinum catalyst inhibitors and their use in addition cure compositions (hydrosilation reaction).

Other ingredients can also be present in the mixtures used in the present method such as fillers. Some fillers may be used in small amounts, such a ground quartz or other non-reinforcing fillers, preferably, less than 5 weight percent. Other ingredients include heat stability additives, pigments or other colorants. However, the additives or the amounts used should not be detrimental to the crumb properties.

The amounts of (B) mixed with 100 parts by weight of (A) should be at least 0.1 part by weight. Preferably, (B) is present in an amount of at least 0.5 part by weight. The preferred amounts of (B) are from 0.5 to 10 parts by weight per 100 parts by weight of (A).

The amounts of (C) mixed with the mixtures of (A) and (B) should be at least one part by weight of platinum element per one million parts by weight of (A) and (B).

The mole ratio of silicon-bonded vinyl to silicon-bonded hydrogen can vary broadly such as from 0.01:1 to 30:1.

The ingredients (A), (B), and (C) are thoroughly mixed to cure and provide the crumb. The mixtures can be cured at room temperature or by heating them. The ingredients suitable for this method are those which combine to provide a cured product with low internal shear strength and a low durometer. If the tensile strength and elongation at break for the cured product are too high, the low shear mixing of the present invention will not produce a crumb or the crumb produced will not be suitable in hydraulic applications. Preferably, the cured products should have tensile strengths and elongations at break which are not detectable when determined by the test procedure of ASTM-D-412. The ingredients also preferably combine to provide a cured product which has a durometer on the Shore OO scale of less than 65. The crumb made by the method of the present invention has an extrusion rate of at least 50 grams per minute, preferably at least 800 grams per minute. This extrusion rate is determined by packing the crumb into a Semco tube with an orifice of 0.5 inch. The crumb is then extruded through the orifice for 10 seconds at a pressure of 345 kilopascals. The extruded crumb is weighed and then multiplied by six to get grams per minutes. The extrusion rate of the crumb shows the ease with which the crumb can be transferred from one location to another such as in a brake system, i.e. the rate of flow. The extrusion rate also relates to the ease with which the crumb can be transported by pneumatic means. The higher the extrusion rates means the more easily the crumb will flow.

The crumb produced by the present invention also has compression points of less than 1035 kilopascals for the first two compressions. Compression points are determined by placing the crumb in a 10 milliliter syringe and pressing the plunger at the rate of one inch per minute using a tensiometer. The pressure at which the crumb goes from opaque to clear is recorded as the compression. The pressure is then released and the observance is made as to whether the clear material returns to crumb. Each compression and subsequent release of pressure is a cycle. In addition to the first compression, a crumb may be given five cycles. The compression points relate to the ease with which the crumb can be compressed and once in the compressed state, i.e. the clear, liquid appearing state, the pressure applied at any point in the system is transferred equally throughout the clear compressed state in the same manner as it is with a liquid. The subsequent release of the pressure to observe whether the crumb returns to its original crumb state shows the reusability of the silicone crumb of this invention.

The extrusion points of the crumb of this invention are also determined by placing the crumb in a syringe which has a 1/16 of an inch orifice. The extrusion point is determined by placing the syringe in a compression jig for a tensiometer and compressing at the rate of one inch per minute. The minimum pressure needed to push the crumb through the orifice is the extrusion point. The extrusion point is an indication of the ability of the crumb to leak for openings. The extrusion point also shows that the crumb stays put unless there is force being applied to the crumb and that once the force is removed the crumb will stop leaking.

The crumb made by the present invention is useful for brake systems and other systems which can use hydraulic materials. The crumb can be used to control the pressure to a predetermined value by being a readily flowable material the pressure can be controlled by adding crumb to increase the pressure and removing crumb from the system to reduce the pressure.

The crumb made by the present invention is more reversion resistant under confined conditions at the same temperature and pressure than the peroxide cured hydraulic elastomer powder of Bruner. The crumb is also safe and non-intrusive, flowable, pressurizable medium and has high, unique expansion characteristics. These properties are important features for a material which is to be used in a closed system, especially for the hydraulic systems.

The method of the present invention makes crumb in a short period of time and with simple equipment if desired. This method can be used to remove unwanted volatile materials in the crumb which could interfere with later use of the crumb in hydraulic applications, thus eliminating the need for expensive baking procedures which are often used to remove volatile materials. The present method eliminates the need for cryogenically grinding silicone materials.

The following examples are for illustrative purposes and should not be construed as limiting the present invention which is properly delineated in the claims. The "parts" are parts by weight unless otherwise stated. The viscosities were measured at 25° C. unless otherwise specified.

EXAMPLE 1

A complex obtained by the reaction of chloroplatinic acid and sym-divinyltetramethyldisiloxane and diluted with a siloxane polymer to give 0.7 weight percent platinum element in an amount of 0.3 part was mixed into 100 parts vinyl-containing polymethylsiloxane containing 87.95 mole percent dimethylsiloxane units, 5.66 mole percent methylsilsesquioxane units, 5.57 mole percent trimethylsiloxy units, and 0.82 mole percent dimethylvinylsiloxy units, and having a viscosity of about 0.00115 square meters per second ($m^2/s$). The mixture was placed in a container which was placed on a paint shaker for six minutes and then rotated 180 degrees and then shaken for another six minutes to ensure that the platinum complex was thoroughly mixed with the polymethylsiloxane. To the resulting mixture, 1.0 part of a trimethylsiloxy endblocked polymethylhydrogensiloxane having a silicon-bonded hydrogen content of 1.55 weight percent was added and the resulting mixture was stirred with an air stirrer. The viscosity of the mixture began to rise after one minute and after five minutes it was completely cured and in the form of crumb. The crumb was a very fine close to the mixing blades and larger chunks were found away from the blade. The large chunk were broken into fine particles by hand. The volume of the crumb was double the volume of the starting materials.

The cured product has a durometer on the Shore OO scale of 55, but it was too weak to measure the tensile strength and the elongation. The weight loss of the cured product was 0.72 weight percent determined by heating it at 150° C. for two hours at 91.2 kilopascals pressure. The extrusion rate of the crumb was 2483 grams per minute, the extrusion point was 531 kPa, and the compression points were 518 kPa, 420 kPa, 421 kPa, 471 kPa, and 538 kPa at compressions 1, 2, 3, 4, and 5 respectively.

EXAMPLE 2

When crumb is formed in the same manner as described in Example 1, except the ingredients used are 100 parts of a polymethylsiloxane as described in Example 1 except that the viscosity was about 0.00115 m²/s, 1.0 part of the polymethylhydrogensiloxane as defined in Example 1, 0.25 part of the platinum complex as defined in Example 1, and 0.01 part of ethynylcyclohexanol, the crumb has similar properties to Example 1. The mixture can be cured to a product which has a durometer on the Shore OO scale of 58, a tensile strength at break of 13.8 kilopascals, and an elongation at break of 7%.

EXAMPLE 3

When crumb is formed in the same manner as described in Example 2, except 5 parts of the polymethylhydrogensiloxane as defined in Example 1 is used and the other ingredients are the same, the crumb will have properties similar to Example 1. The mixture can be cured to a product which has a durometer on the Shore OO scale of 42, but it was too weak to measure the tensile strength and the elongation.

EXAMPLE 4

When crumb is formed in the same manner as described in Example 3, except 10 parts of the polymethylhydrogensiloxane is used instead of the 5 parts and the other ingredients are the same, the properties of the crumb makes it useful for hydraulic applications. The mixture when cured by heating at 150° C. for 10 minutes can produce a product which has a durometer on the Shore OO scale of 43, but it is too weak to measure the tensile strength and the elongation.

EXAMPLE 5

When crumb is formed in the same manner as described in Example 1, except the ingredients are 100 parts of a trimethylsiloxy endblocked polymethylvinylsiloxane having a viscosity of 0.035 m²/s, 3.5 parts of the polymethylhydrogensiloxane as described in Example 1, and 0.35 part of the platinum complex as defined in Example 1, crumb can be obtained which is useful for hydraulic applications.

That which is claimed is:

1. A method of making a silicone crumb comprising mixing under low shear the following ingredients which cure to a material with a low internal shear strength and a low durometer,
  (A) a vinyl-containing polyorganosiloxane consisting essentially of units selected from the group consisting of diorganosiloxane units, monoorganosilsesquioxane units, and triorganosiloxy units in which the organic radicals are monovalent hydrocarbon radicals or monovalent halogenated hydrocarbon radicals, in the polyorganosiloxane the organic radicals being such that at least 0.1 weight percent of them are vinyl radicals,
  (B) a silicon-bonded hydrogen containing polysiloxane in which there is at least 0.5 weight percent silicon-bonded hydrogen atoms, the valences of the silicon atoms not being satisfied by divalent oxygen atoms or silicon-bonded hydrogen atoms are satisfied by monovalent hydrocarbon radicals or monovalent halogenated hydrocarbon radicals,
  (C) a platinum catalyst for the hydrosilation reaction of (A) and (B), the mixing being continued until a crumb which is in a fine particulate form which exhibits an extrusion rate of at least 50 grams per minute through an orifice of 0.5 inch diameter under a pressure of 345 kilopascals and compression points of less than 1035 kilopascals for the first two compressions, said mixing being sufficient to thoroughly mix the ingredients before significant cure takes place and crumb is formed.

2. The method in accordance with claim 1 further comprising extruding the crumb through a particle sizer to make uniform particle distribution.

3. The method in accordance with claim 1 in which the ingredients cure to a material with a durometer on the Shore OO scale of less than 65.

4. The method in accordance with claim 2 in which the ingredients cure to a material with a durometer on the Shore OO scale of less than 65.

5. The method in accordance with claim 1 in which the ingredients are mixed and heated to shorten the cure and crumb time.

6. The method in accordance with claim 2 in which the ingredients are mixed and heated to shorten the cure and crumb time.

7. The method in accordance with claim 3 in which the ingredients are mixed and heated to shorten the cure and crumb time.

8. The method in accordance with claim 4 in which the ingredients are mixed and heated to shorten the cure and crumb time.

9. The method in accordance with claim 3 in which the ingredients cure to a material which has no measurable tensile strength at break and no measurable elongation at break as determined by the test procedure of ASTM-D-412.

10. The method in accordance with claim 4 in which the ingredients cure to a material which has no measurable tensile strength at break and no measurable elongation at break as determined by the test procedure of ASTM-D-412.

11. The method in accordance with claim 7 in which the ingredients cure to a material which has no measurable tensile strength at break and no measurable elongation at break as determined by the test procedure of ASTM-D-412.

12. The method in accordance with claim 8 in which the ingredients cure to a material which has no measurable tensile strength at break and no measurable elongation at break as determined by the test procedure of ASTM-D-412.

13. The method in accordance with claim 5 further comprising carrying out the curing and crumbing process in a closed chamber and reducing the pressure within the chamber during the curing and crumbing process thereby removing unreacted and unreactable low molecular species and providing a crumb with a low weight loss.

14. The method in accordance with claim 6 further comprising carrying out the curing and crumbing process in a closed chamber and reducing the pressure within the chamber during the curing and crumbing process thereby removing unreacted and unreactable low molecular species and providing a crumb with a low weight loss.

15. The method in accordance with claim 7 further comprising carrying out the curing and crumbing process in a closed chamber and reducing the pressure within the chamber during the curing and crumbing process thereby removing unreacted and unreactable low molecular species and providing a crumb with a low weight loss.

16. The method in accordance with claim 8 further comprising carrying out the curing and crumbing process in a closed chamber and reducing the pressure within the chamber during the curing and crumbing process thereby removing unreacted and unreactable low molecular species and providing a crumb with a low weight loss.

17. The method in accordance with claim 11 further comprising carrying out the curing and crumbing process in a closed chamber and reducing the pressure within the chamber during the curing and crumbing process thereby removing unreacted and unreactable low molecular species and providing a crumb with a low weight loss.

18. The method in accordance with claim 12 further comprising carrying out the curing and crumbing process in a closed chamber and reducing the pressure within the chamber during the curing and crumbing process thereby removing unreacted and unreactable low molecular species and providing a crumb with a low weight loss.

19. The method in accordance with claim 1 in which the crumb exhibits an extrusion rate of at least 800 grams per minute.

20. The method in accordance with claim 2 in which the crumb exhibits an extrusion rate of at least 800 grams per minute.

21. The method in accordance with claim 4 in which the crumb exhibits an extrusion rate of at least 800 grams per minute.

22. The method in accordance with claim 6 in which the crumb exhibits an extrusion rate of at least 800 grams per minute.

23. The method in accordance with claim 8 in which the crumb exhibits an extrusion rate of at least 800 grams per minute.

24. The method in accordance with claim 12 in which the crumb exhibits an extrusion rate of at least 800 grams per minute.

25. The method in accordance with claim 18 in which the crumb exhibits an extrusion rate of at least 800 grams per minute.

26. The method in accordance with claim 5 further comprising a platinum catalyst inhibitor is present in the ingredients being mixed.

27. The method in accordance with claim 6 further comprising a platinum catalyst inhibitor is present in the ingredients being mixed.

28. The method in accordance with claim 7 further comprising a platinum catalyst inhibitor is present in the ingredients being mixed.

29. The method in accordance with claim 8 further comprising a platinum catalyst inhibitor is present in the ingredients being mixed.

30. The method in accordance with claim 9 further comprising a platinum catalyst inhibitor is present in the ingredients being mixed.

31. The method in accordance with claim 25 further comprising a platinum catalyst inhibitor is present in the ingredients being mixed.

* * * * *